(12) United States Patent
Pleskach et al.

(10) Patent No.: US 7,285,000 B2
(45) Date of Patent: Oct. 23, 2007

(54) ELECTRO-FLUIDIC INTERCONNECT ATTACHMENT

(75) Inventors: Michael Pleskach, Orlando, FL (US); Paul Koeneman, Palm Bay, FL (US); Carol Gamlen, Melbourne, FL (US); Steven R. Snyder, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 183 days.

(21) Appl. No.: 11/202,530

(22) Filed: Aug. 12, 2005

(65) Prior Publication Data

US 2007/0053158 A1    Mar. 8, 2007

(51) Int. Cl.
H01R 4/60 (2006.01)
(52) U.S. Cl. .................................... 439/190
(58) Field of Classification Search ........ 439/190–196, 439/289
See application file for complete search history.

(56) References Cited

U.S. PATENT DOCUMENTS

| | | | |
|---|---|---|---|
| 3,810,258 A * | 5/1974 | Mathauser | 439/39 |
| 5,197,895 A | 3/1993 | Stupecky | |
| 5,325,267 A * | 6/1994 | Ewing | 361/760 |
| 6,319,057 B2 * | 11/2001 | Sekido et al. | 439/190 |
| 6,320,546 B1 | 11/2001 | Newton et al. | |
| 6,685,491 B2 * | 2/2004 | Gergek | 439/191 |
| 2005/0068726 A1 | 3/2005 | Pleskach et al. | |

* cited by examiner

Primary Examiner—Briggitte R. Hammond
(74) Attorney, Agent, or Firm—Sacco & Associates, PA; Robert J. Sacco

(57) ABSTRACT

An electro-fluidic interconnection. The interconnection includes a body (200) formed of a ceramic material. The body (200) is provided with an aperture (206) having a profile suitable for receiving an interconnecting conduit (400). The interconnecting conduit (400) can be formed of the same type of ceramic material as the body (200). The conduit (400) is defined by an outer shell (403) with a hollow bore (402) for transporting a fluid. A mating portion (404) of the conduit has an exterior profile that matches the profile of the aperture. Moreover, the mating portion (404) of the conduit (400) can be compression fitted within the aperture (206). Conductive traces (406, 208) on the conduit and the body can be electrically connected to complete the electro-fluidic interconnection.

6 Claims, 8 Drawing Sheets

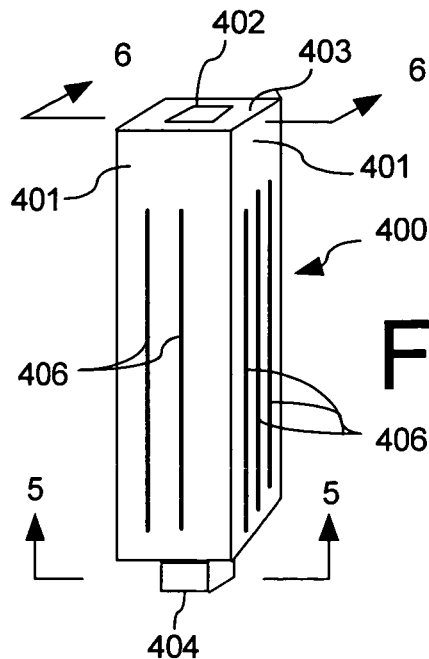
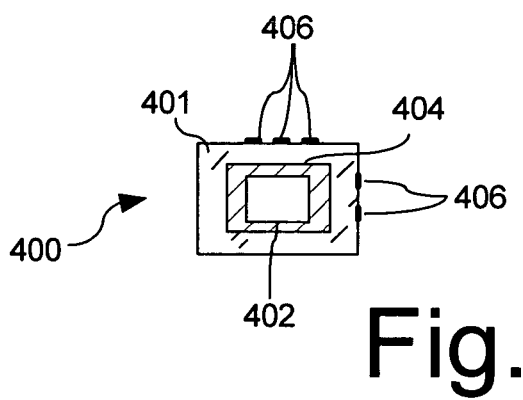
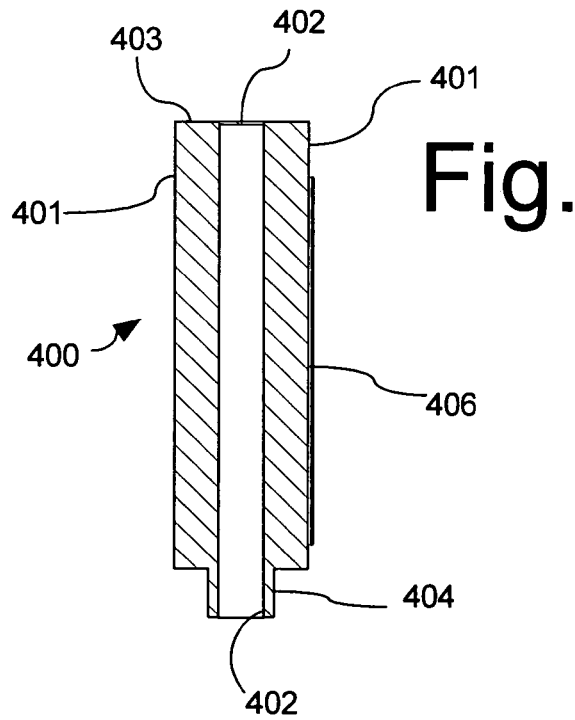

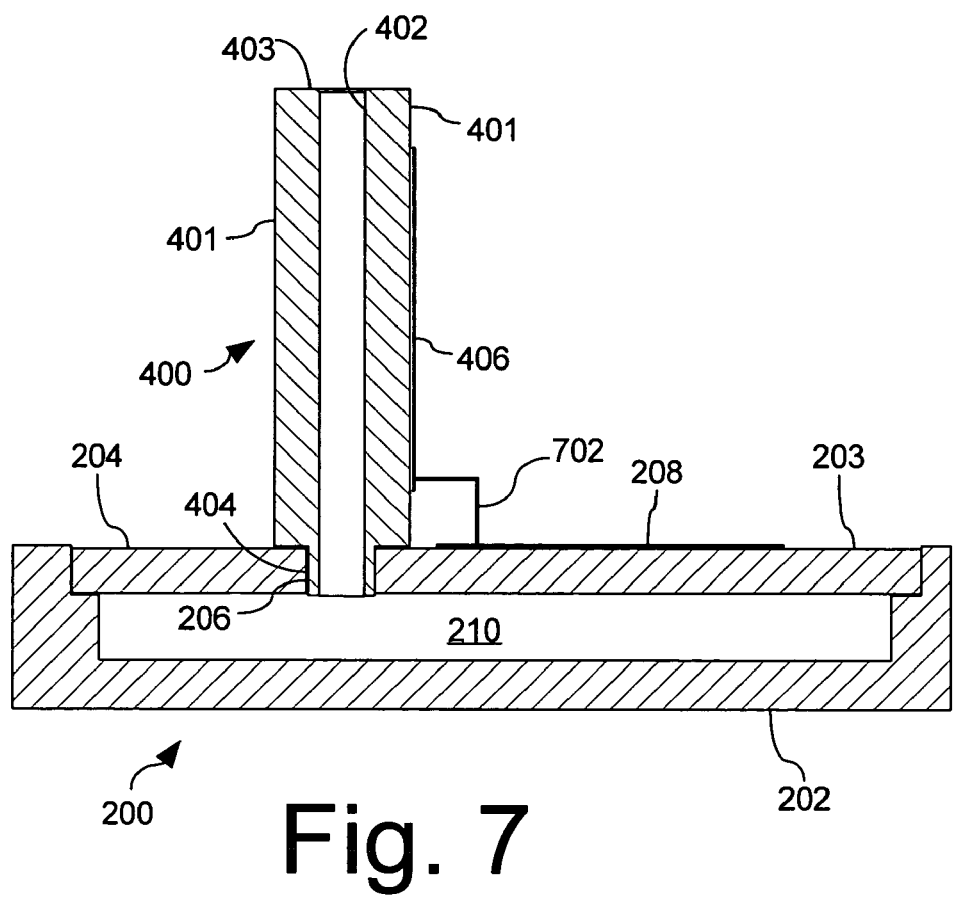
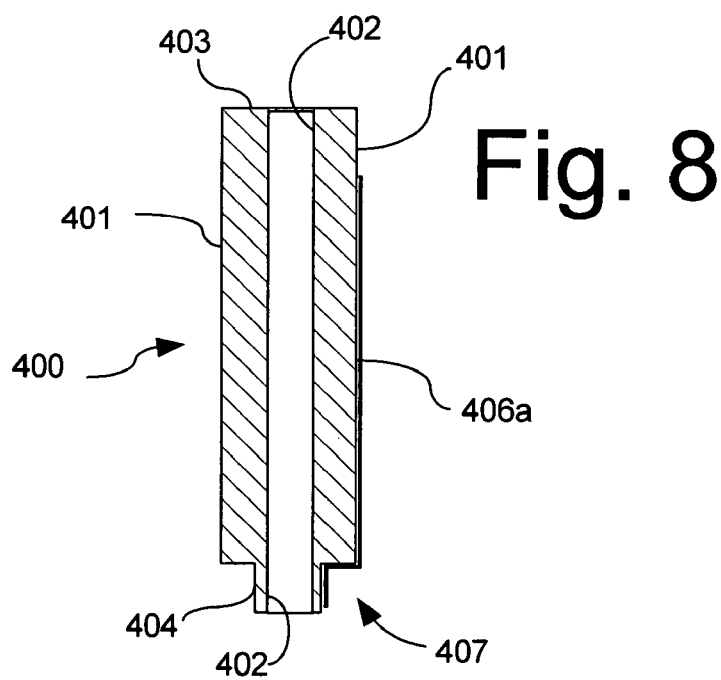

ELECTRO-FLUIDIC INTERCONNECT ATTACHMENT

STATEMENT REGARDING FEDERALLY SPONSORED RESEARCH OR DEVELOPMENT

This invention was made with government support under Government Contract Number NBCHC010060 awarded by the Defense Advanced Research Projects Agency (DARPA). The government has certain rights in the invention.

BACKGROUND OF THE INVENTION

1. Statement of the Technical Field

The inventive arrangements relate to electronic devices, and more particularly to electronic devices that require fluid transport and high-density electrical connections in close proximity.

2. Description of the Related Art

Electro-fluidic micro-electromechanical systems (MEMS) can create significant packaging demands. The requirements of such systems are complicated by the fact that it is often necessary to make a fluid connection, in addition to one or more electrical connections. For example, current applications can require more than 80 electrical connections and at least two fluid connections in an area about 1 $cm^2$. Known problems with conventional interconnection systems include leaks, corrosion, and leaching of metallic ions to active sensing areas. Further, polymers can absorb and desorb fluids. All of these effects can negatively impact device longevity and performance.

High-power and high-temperature electronic devices can also require fluid transport and high-density electrical connections in close proximity to one another. For example, densely manufactured high-power electronics often require fluid-based thermal management designs that comprise a combination of compact electrical connections and micro-fluidic channels. Similarly, micro-combustion generators and solid-oxide fuel cells often operate at high temperatures. Systems of this type can require interfaces that include densely packed electrical connections, combined with interfaces for transport of fuel, air and exhaust. Moreover, they must be physically robust, and capable of operating in a high temperature environment.

Despite the need for a hybrid interconnection system with integral electrical and micro-fluidic interfaces, there are few good options available. This is particularly true where the interconnection system must exhibit good mechanical strength characteristics, and be capable of operating for extended periods at high temperatures. Conventional feed attachment methods rely on organic adhesives, inorganic adhesives (cements), welding, brazing, and glass seals. Each of these approaches has its limitations. For example, sealed high-temperature interfaces with integral electrical connections are difficult to fabricate using adhesive-based systems. Adhesive based designs tend to degrade at elevated temperatures. Cements and glass seals suffer from poor bond strength or toughness. Metal based designs can exhibit good physical strength, but emerging power generation technologies operate at very high temperatures and often require greater thermal isolation than is available with metal based interconnects.

SUMMARY OF THE INVENTION

The invention concerns a method for fabricating an electro-fluidic interconnect. The process can begin with a body formed of a ceramic material. For example the ceramic material can be selected to be a low-temperature co-fired ceramic. An aperture can be created in a portion of the body. The aperture can have a predetermined profile designed for receiving an interconnecting conduit. The conduit can also be formed of ceramic and can include at least one hollow bore for transporting a fluid. One or more conductive traces can be disposed on a portion of the body and on a portion of the conduit. The conduit can have a mating portion with an exterior profile that matches the predetermined profile of the aperture formed in the body. The mating portion of the conduit can be inserted into the aperture, after which the conduit and the body can be co-fired together. An electrical connection can be formed between one or more conductive traces on the portion of the conduit and the conductive traces on the portion of the body. According to one aspect of the invention, the body or the conduit can be fired separately, prior to the co-firing step. For example, the conduit can be in a post-fired condition prior to being inserted into aperture of the body. The body can be in an un-fired condition prior to said co-firing step.

According to one aspect of the invention, the electrical connection can be formed with conductive wires respectively attached between the conductive traces on the portion of the conduit and conductive traces on the portion of the body. According to another embodiment, one or more conductive traces on the portion of the conduit can be aligned with one or more conductive traces on the portion of the body. Thereafter, when the mating portion of the conduit is inserted into the aperture, the electrical connection between the conductive trace on the portion of the conduit and the conductive trace on the portion of the body can be established by means of a direct physical contact between the respective conductive traces.

The invention also concerns an electro-fluidic interconnect. The interconnect includes a body formed of a ceramic material. The body is provided with an aperture having a profile suitable for receiving an interconnecting conduit. The interconnecting conduit can be formed of the same type of ceramic material as the body. The conduit is defined by an outer shell having at least one hollow bore for transporting a fluid. A mating portion of the conduit has an exterior profile that matches the profile of the aperture. Moreover, the mating portion of the conduit can be compression fitted within the aperture as a result of the firing process. The mating portion of the conduit can also be chemically bonded with one or more portions of a surface defining the aperture as a result of the firing process.

According to one aspect of the invention, one or more conductive traces can be provided on a portion of the body. Similarly, one or more conductive traces can be provided on a portion of the conduit. The selected conductive traces on the portion of the body can be connected to selected conductive traces on the portion of the conduit. This electrical connection can be provided by means of conductive wire connecting the conductive traces on the body and the conductive traces on the portion of the conduit.

According to another aspect of the invention, the one or more conductive traces on the portion of the body and the conductive traces on the portion of the conduit can be physically aligned. Consequently, the individual conductive traces on the portion of the body can be in direct physical contact with individual ones of the conductive traces formed on the portion of the conduit. The compression fitting of the conduit within the aperture can maintain the direct physical contact between the conductive traces. As an alternative, or in addition to, the direct physical contact of the conductive traces formed on the conduit and on the body, the electrical connection can be improved by disposing a conductive adhesive material between the conductive traces. A conductive adhesive could provide an electrical connection that would be more compliant to mechanical stresses as compared to a direct physical contact.

Notably, the conductive adhesive need not serve any structural purpose as the conduit and the body will be secured together as a result of the cofiring process. Thus, the adhesive need only provide a sufficient bond to adhere to the conductive traces. According to one embodiment, the conductive adhesive can be a conventional conductive adhesive, such as a conductive epoxy. If a conventional conductive adhesive is used, it could be applied exclusively to the area between the conductive traces that are to be connected to one another. According to another embodiment, the conductive adhesive could be an anisotropic conductive adhesive. If an anisotropic conductive adhesive is used, the anisotropic conductive adhesive can be selected so that it forms a conductive path only in the direction between conductors that are intended to be connected together, and not between adjacent conductors disposed on the body or on the conduit. An advantage of the anisotropic conductive adhesive is that it could be applied to the entire contact area between the body and the conduit.

According to yet another embodiment, the invention can include a method for fabricating an electro-fluidic interconnect. The method can begin with a body formed of a ceramic material. An aperture can be formed in the body that has a first mating portion associated therewith. The mating portion can have an interior profile and an exterior profile. A conduit can also be formed of a ceramic material. The conduit can have at least one hollow bore for transporting a fluid. The conduit can also include a second mating portion for mating with the first mating portion. Either the conduit or the body can be pre-fired at this point. After this firing step, an interior profile of the second mating portion or an exterior profile of the second mating portion can be sized and shaped to generally match the interior profile or the exterior profile of the first mating portion. Thereafter, the first and the second mating portions can be joined together. The matching profiles of the first and second mating portions can allow the first and second mating portions to fit together snugly. Thereafter, the conduit and the body can be co-fired together to form a compression fitting at the first and second mating portion.

The method can also include disposing at least one conductive trace on a portion of the conduit and at least one conductive trace on a portion of the body. Further, an electrical connection can be formed between the one or more conductive traces on the portion of the conduit and the conductive traces on the portion of the body. The electrical connection can be formed with a conductive wire attached between the conductive trace or traces on the portion of the conduit and the conductive traces on the portion of the body. At least a portion of one or more conductive traces on the portion of the conduit can be aligned with at least a portion of one or more conductive trace on the portion of the body. Thereafter, the electrical connection can be formed by direct contact between the conductive trace or traces on the portion of the conduit with the conductive trace or traces on the portion of the body.

BRIEF DESCRIPTION OF THE DRAWINGS

FIG. 4 is perspective view of a conduit that can form a second portion of an electro-fluidic interconnect.

FIG. 5 is a cross-sectional view of the conduit in FIG. 3, taken along lines 5-5.

FIG. 6 is a cross-sectional view of the conduit in FIG. 3, taken along lines 6-6.

FIG. 7 is a cross-sectional view of the conduit in FIG. 3 inserted within the body of FIG. 1.

FIG. 8 is a cross-sectional view of an alternative embodiment of the conduit in FIG. 3.

DETAILED DESCRIPTION OF THE PREFERRED EMBODIMENTS

Figure 1:
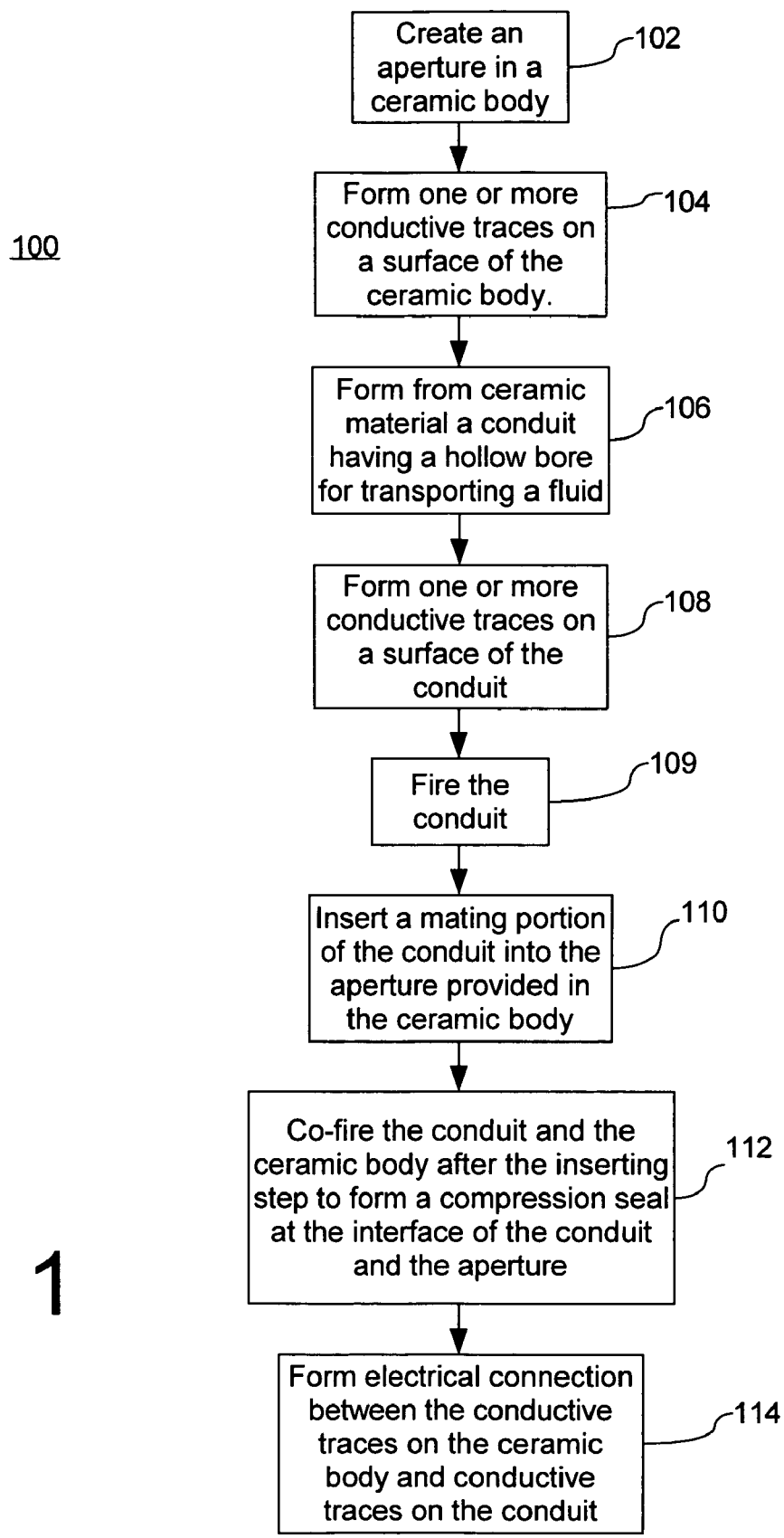
FIG. 1 is a flow chart that is useful for understanding a process for providing an electro-fluidic interconnect.
Figure 2:
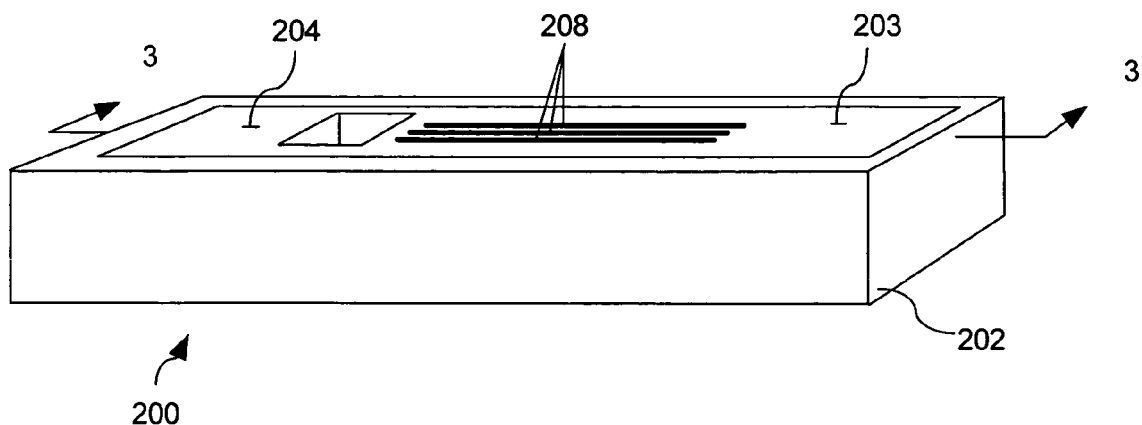
FIG. 2 is a perspective view showing a body to with a first portion of an electro-fluidic interconnect.
Figure 3:
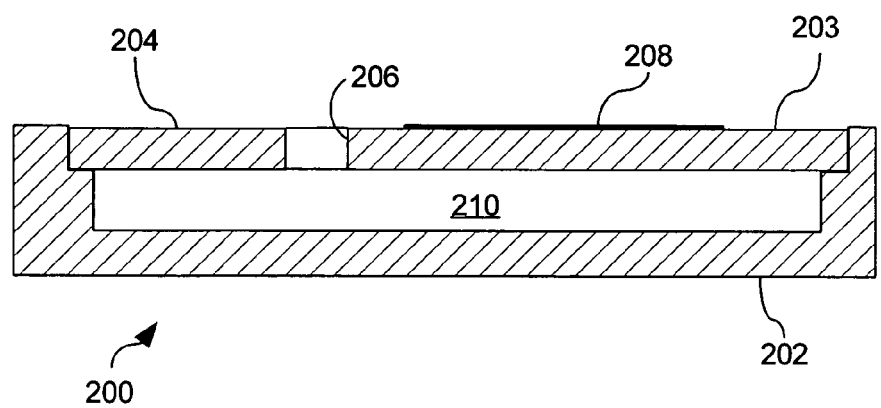
FIG. 3 is a cross-sectional view of the body in FIG. 2.

The present invention concerns an electro-fluidic interconnect system and a method for providing such electro-fluidic interconnect. Referring to FIG. 1 there is shown a flow chart 100 that is useful for understanding a method for providing an electro-fluidic interconnect in accordance with the inventive arrangements. The process can begin in step 102 by forming an aperture in a ceramic body. FIGS. 2 and 3 show an example of a body 200, formed of ceramic material, in which an aperture 206 has been formed. The aperture can be formed by any convenient method as will be understood by one skilled in the art. For example, the ceramic material forming body 200 can be punched or cut to define the aperture 206. In step 104, one or more conductive traces 208 can be formed on a surface 203 of the body 200. As illustrated in FIGS. 2 and 3, the aperture 206 can advantageously be disposed on a portion of the body 200 adjacent to conductive traces 208. Further, the aperture 206 can have a predetermined cross-sectional outline or profile.

According to one embodiment of the invention, body 200 can have an internal cavity 210 suitable for at least partially constraining a fluid. The internal cavity 210 can be arranged so that it is in fluid communication with aperture 206. The internal cavity 210 can be provided for transporting fluid from one location within the body to another location. Alternatively, or in addition thereto, the internal cavity 210 defined by the body 200 can have additional functional characteristics. For example, fluid constrained in internal cavity 210 can be provided for heating or cooling devices (not shown) that are mounted in or on the body 200. Alternatively, fluid constrained within the internal cavity 210 can be used to affect the RF properties of the body 200. Regardless of the purpose for which the fluid is used, it can be desirable to provide a flow of fluid through internal cavity 200. In that case, one or more additional fluid ports (not shown) can also be provided in fluid communication with internal cavity 210.

The body 200 can be comprised of one or more component portions. For in the example shown in FIGS. 2 and 3, the body 200 can include a cover plate 204 and a base 202. However, the precise form of the body 200 is not critical to the invention. In this regard, it should be understood that the arrangement of body 200 shown in FIGS. 2 and 3 is merely intended to illustrate one possible structure of a body 200. In fact, the body 200 can have substantially any form or be a part of any system or device that requires an electro-fluidic interconnection. All that is required is that body 200 be formed of a ceramic and include at least one aperture 206 as previously described.

In step 106, a conduit 400 can be formed from a ceramic material. An example of such a conduit is illustrated in FIGS. 4-6. The conduit 400 can be made by any of a variety of methods well known to those skilled in the field of ceramics. For example, methods for fabrication of ceramic conduits as described herein are disclosed in U.S. Patent Pub. No. 2005/0068726, which is assigned to Harris Corporation. According to one embodiment, the conduit 400 can be formed of the same type of ceramic material as body 200. The conduit 400 can be defined by a shell 403 having an surface 401 and at least one hollow bore 402 formed therein for transporting a fluid. A mating portion 404 of the conduit 400 can have an exterior cross-sectional profile. Its cross-sectional profile can be formed so that in its post-fired state, it will generally match the cross-sectional profile of aperture 206 in an un-fired state of body 200. More particularly, the mating portion 404 after firing can be sized and shaped to fit snugly within aperture 206 before body 200 has been fired.

In FIGS. 4-6, the mating portion 404 of the conduit 400 is shown as having an exterior cross-sectional profile that is somewhat smaller than the cross-sectional profile of outer surface 401 of the shell 403. This difference in exterior dimension can be observed most clearly in FIGS. 5 and 6. However, it should be understood that the invention is not limited in this regard. The mating portion 404 can have an exterior cross-sectional profile that is larger, smaller or the same dimension as the outer surface as 401.

Further, in FIGS. 4-6, the cross-sectional profile of the conduit 400, mating portion 404, and aperture 206, are each rectangular. However, it should be understood that the cross-sectional profile of conduit 400, mating portion 404, and the aperture 206 are not limited to those illustrated in FIGS. 2-6. Instead, these features can have any suitable cross-sectional shape that may be useful or desirable for a particular application, without limitation. For example, they may have cross-sectional profiles that are circular, oval or any other shape.

In step 108, one or more conductive traces can be formed on a surface of the conduit. For example, in FIGS. 4-6 conductive traces 406 are shown disposed on surface 401 of the conduit 400. One or more of the traces 406 can extend along the length of the conduit 400. Further, one end of each such trace can extend to a position on surface 401 that is generally adjacent to mating portion 404.

In step 109, the conduit 400 can be fired in accordance with a conventional firing process appropriate to the particular ceramic material from which the conduit 400 is constructed. The body 200 can remain in an un-fired state for reasons that will hereinafter become apparent. In step 110, a mating portion of the post-fired conduit can be inserted into the aperture provided in the un-fired body. For example, FIG. 7 shows a cross-sectional view of conduit 400 inserted into body 200. More particularly, mating portion 404 of conduit 400 is inserted within aperture 206. In step 112, the post-fired conduit 400 and the un-fired body 200 can be co-fired together in accordance with a processing cycle appropriate to the particular type of ceramic material which is used to form the body and conduit. The firing process in step 110 will advantageously cause the aperture 206 to shrink, forming a very tight compression fit around mating portion 404. In addition to the compression fit, surface bonding will occur at portions of the interface between mating portion 404 and aperture 206. The resulting connection can provide a hermetic fluid connection between the body and the conduit. It will also be exceptionally strong and can be provided without the need for adhesives.

In step 114, electrical connections can be formed between the conductive traces 406 disposed on the conduit, and the conductive traces 208 formed on the body 200. FIG. 7 shows that a ribbon or wire conductor 702 can be bonded to each of the conductive traces 208, 406 to form the connection. Modified wire bonding techniques can be used for this purpose. For example, wire conductor 702 formed of the same or different types of material as compared to conductive traces 208, 406 can be bonded together by means of high-speed thermo-compression and/or ultrasonic bonding. For example, a micro-wire or tape, which is generally made of gold or aluminum, can be fused to the surface of the traces 208, 406 using conventional techniques.

Figure 9:
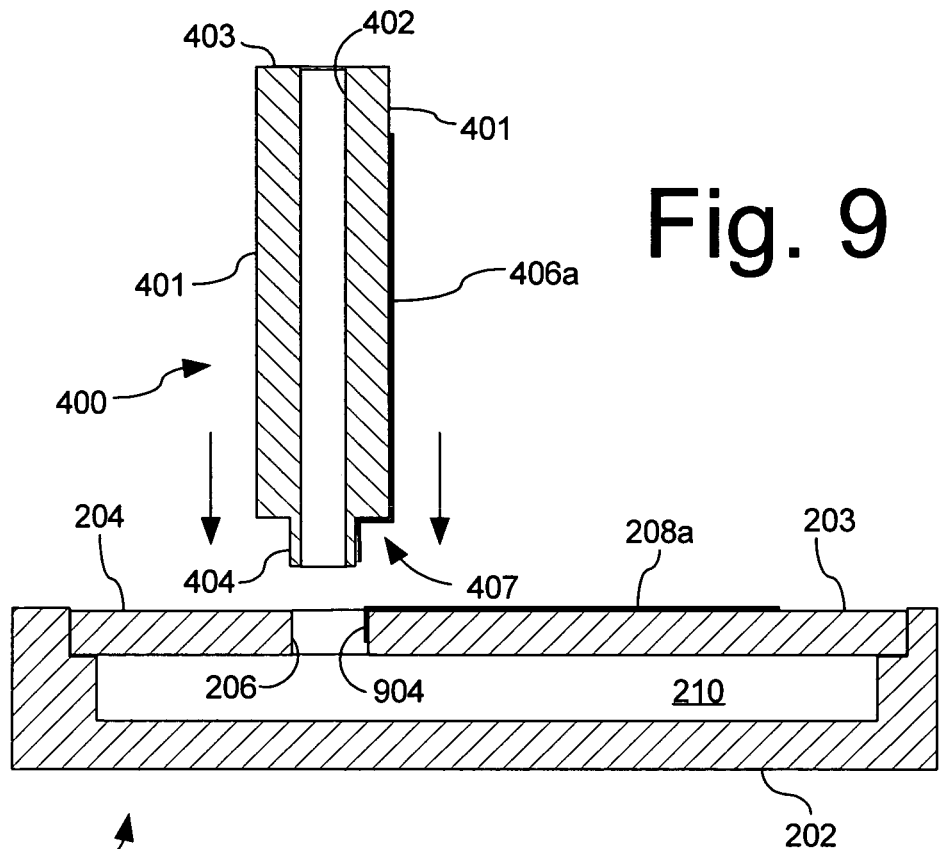
FIG. 9 is a cross-sectional view showing how the conduit in FIG. 8 can be inserted in an alternative embodiment of the body in FIG. 3.
Figure 10:
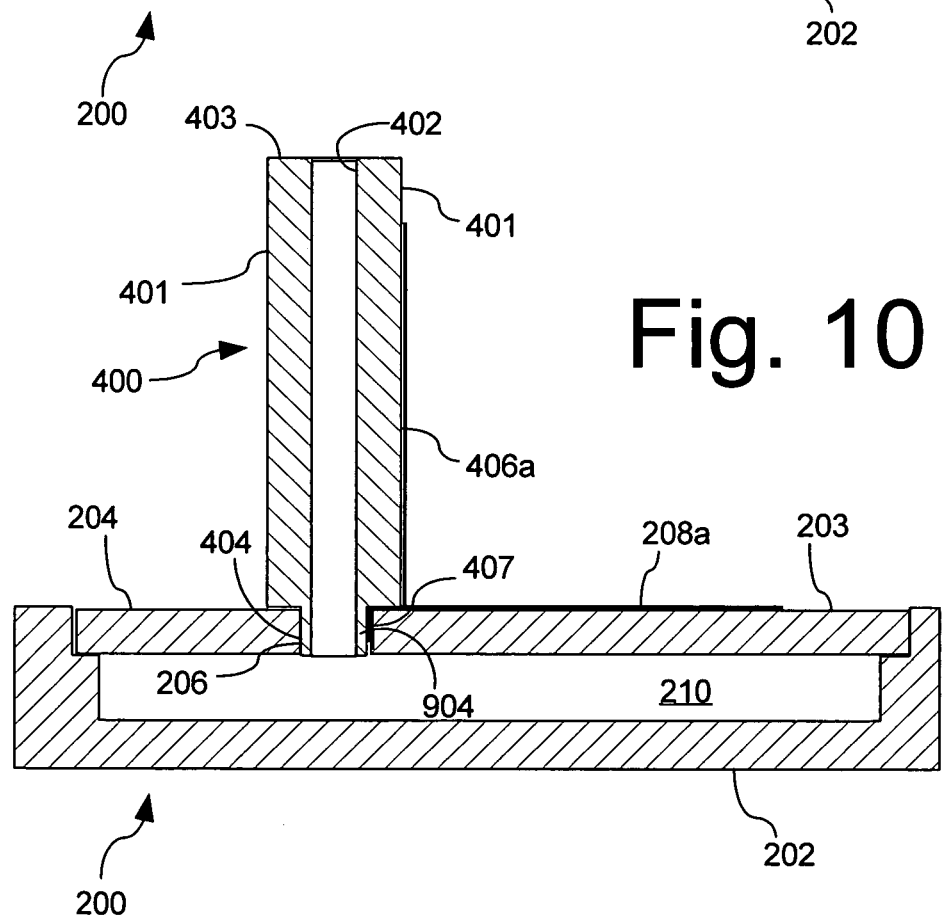
FIG. 10 is a cross-sectional view showing the conduit in FIG. 8 fully inserted into the body in FIG. 9.
Figure 11:
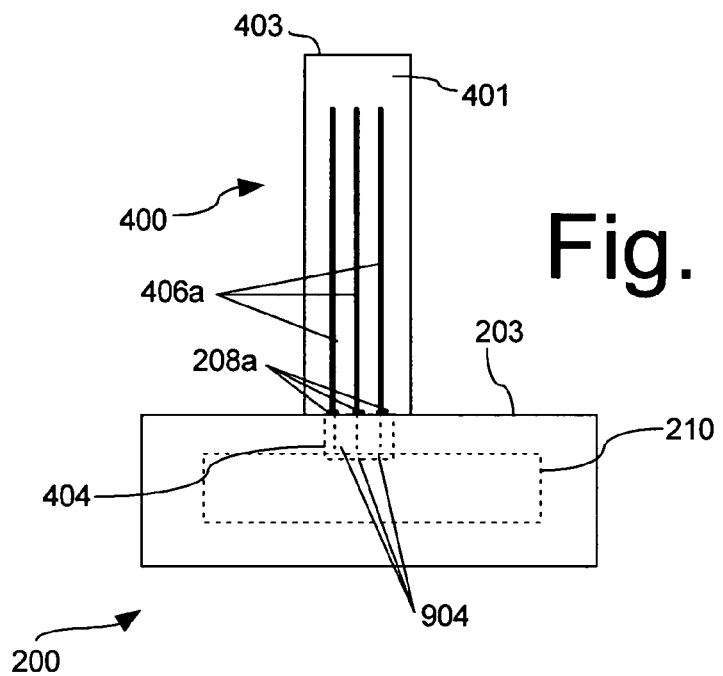
FIG. 11 is a side elevation view of the conduit in FIG. 8 fully inserted into the body in FIG. 9.

According to another aspect of the invention, the electrical connection formed in step 114 can be accomplished without the need for wire conductor 702. Referring to FIG. 8, conductive traces 406a can be formed on conduit 400 which extend to a conduit interface area 407 adjacent to mating portion 404. Referring to FIG. 9, conductive traces 208a can similarly extend to a body interface area 904. As shown in FIGS. 10 and 11, the conduit 400 can then be inserted in body 400 as previously described in step 110 and the two components can be co-fired as described in relation to step 112. The Individual traces 208a, 406a, can be positioned so that they are generally aligned with one another after the co-firing step. The compression fit resulting from such co-firing will maintain the traces 208a in direct physical contact with traces 406a to form an electrical connection.

As an alternative, or in addition to, the direct physical contact of the conductive traces 208a, 406a formed on the conduit and on the body, the electrical connection can be improved by disposing a conductive adhesive material (not shown) between the conductive traces 208a, 406a in the area where they are to be connected. A conductive adhesive could provide an electrical connection that would be more compliant to mechanical stresses as compared to a direct physical contact. In this regard it may be noted that the conductive adhesive is not required to serve any structural purpose as the conduit 400 and the body 200 will be secured together as a result of the cofiring process. Thus, the adhesive need only provide a sufficient bond to adhere to the conductive traces 208a, 406a.

According to one embodiment, the conductive adhesive can be a conventional conductive adhesive, such as a conductive epoxy. If a conventional conductive adhesive is used, it could be applied exclusively to the area between the conductive traces 208a, 406a that are to be connected to one another. According to another embodiment, the conductive adhesive could be an anisotropic conductive adhesive. Anisotropic adhesives exhibit different electrical properties according to the direction of measurement. If an anisotropic conductive adhesive is used, the anisotropic conductive adhesive can be selected so that it forms a conductive path only in the direction between conductors 208a, 406a that are intended to be connected together, and not between adjacent conductors disposed on either the body or on the conduit. An advantage of the anisotropic conductive adhesive is that it could be applied to the entire conduit interface area 407 and/or body interface area 904 between the body and the conduit.

The foregoing arrangements provide a strong electro-fluidic connection that can be useful in a wide variety of applications. Fluids can be communicated to the body 200 through hollow bore 402. Electrical signals and power can be communicated through the conductive traces 406, 406a, 208, 208a. Electrical and fluid connections can be formed at an end of conduit 400 opposed from the mating portion 404. The electrical and fluid connections at the opposing end of conduit 400 can be formed using the same techniques described herein. However, in many instances, the elongated length of the conduit 400 can be sufficient to separate such electrical and fluid connections from a source of heat associated with body 200. In that case, it can be desirable to utilize more conventional arrangements for providing electrical and fluid connections to the conduit 400.

Figure 12:
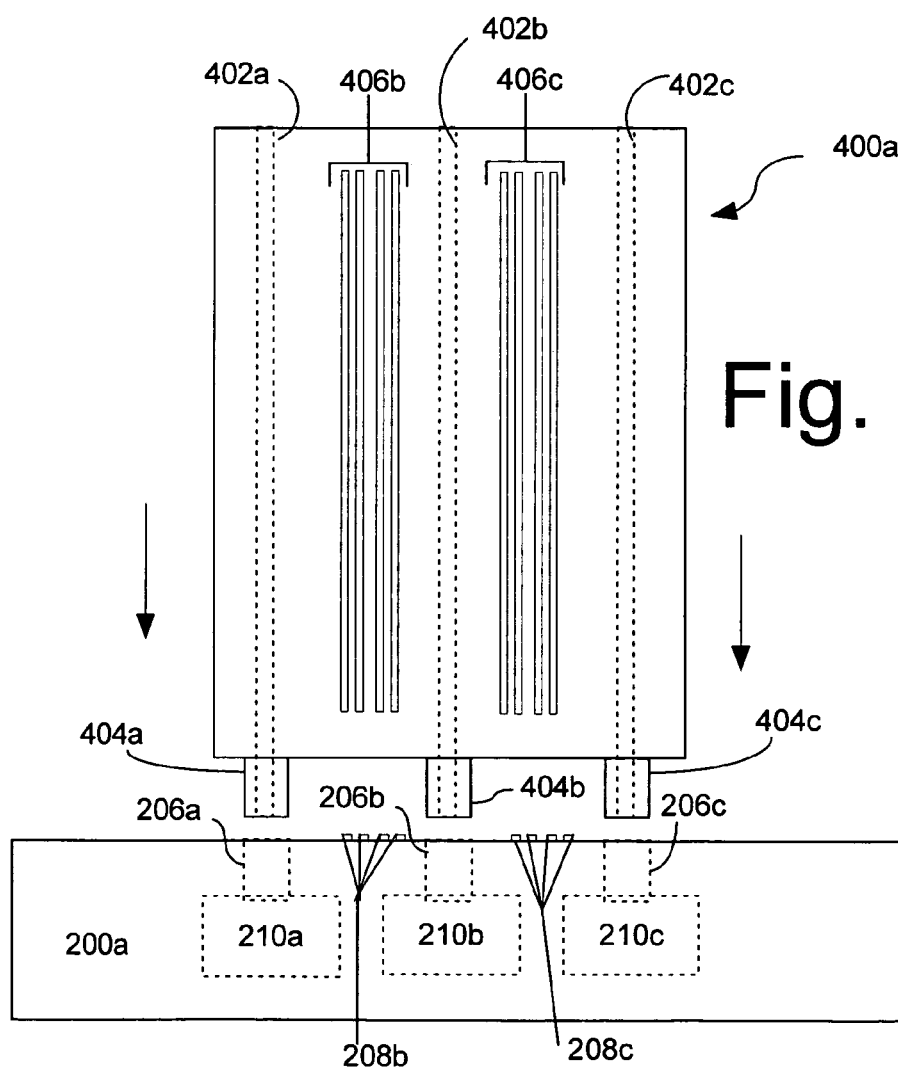
FIG. 12 is a side elevation view of an alternative embodiment of the invention showing a conduit with multiple bores for transporting fluid.

Further, it should be understood that the conduit need not be limited to a single bore. As shown in FIG. 12, conduit 400a can be formed with a plurality of such hollow bores 402a, 402b, 402c. Each hollow bore can have its own individual mating portion 404a, 404b, 404c or they can share a common mating portion. Each of the hollow bores 402a, 402b, 402c can communicate a fluid to an aperture 206a, 206b, 206c associated with respective internal cavities 210a, 210b, 210c of a ceramic body 200a.

It should be further understood that the present invention is not limited to the specific structures and processes described herein. Instead, the present invention is intended to encompass any arrangement of structures that will result in a compression fitting as between the ceramic conduit and the ceramic body after firing. The structure of the conduit, aperture, ceramic body, and mating structure can be modified within the scope of the present invention. The order of the firing steps can also be modified, depending on the particular structure that is selected. All that is necessary is that the structure and the processes selected result in a compression fitting between mating parts of the conduit and the ceramic body.

Figure 13:
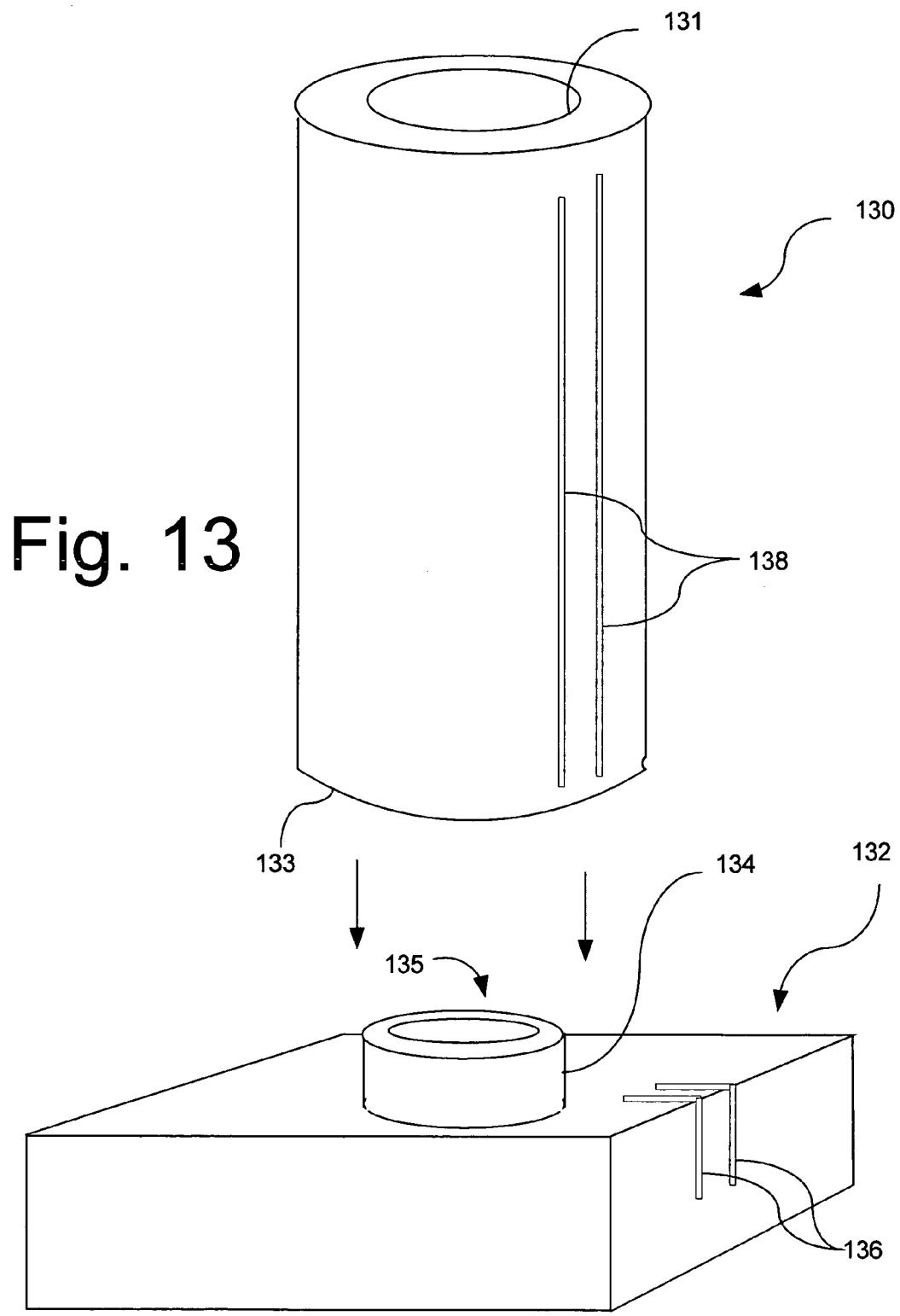
FIG. 13 is a perspective view showing an alternative embodiment of the invention.

For example, referring to FIG. 13, a second mating portion 134 can be formed on the ceramic body 132 around an aperture 135. Thereafter, the ceramic body 132 can be fired. The mating portion 133 of conduit 130, in an unfired state, can be sized and shaped so that the mating portion 133 will fit around an outer perimeter of the second mating portion 134 of the ceramic body 132 (after the body has been fired). Thereafter, the mating portion 133 of the un-fired conduit 130 could be fitted over the second mating portion 134 of the fired body 132. Once fitted together, the unfired conduit 130 and the ceramic body 132 could be co-fired. The co-firing process will cause the mating portion to shrink around the second mating portion 134 to form a compression fitting as previously described. Conductive traces 138, 136 can be provided as previously described in relation to FIGS. 1-12.

Figure 14:
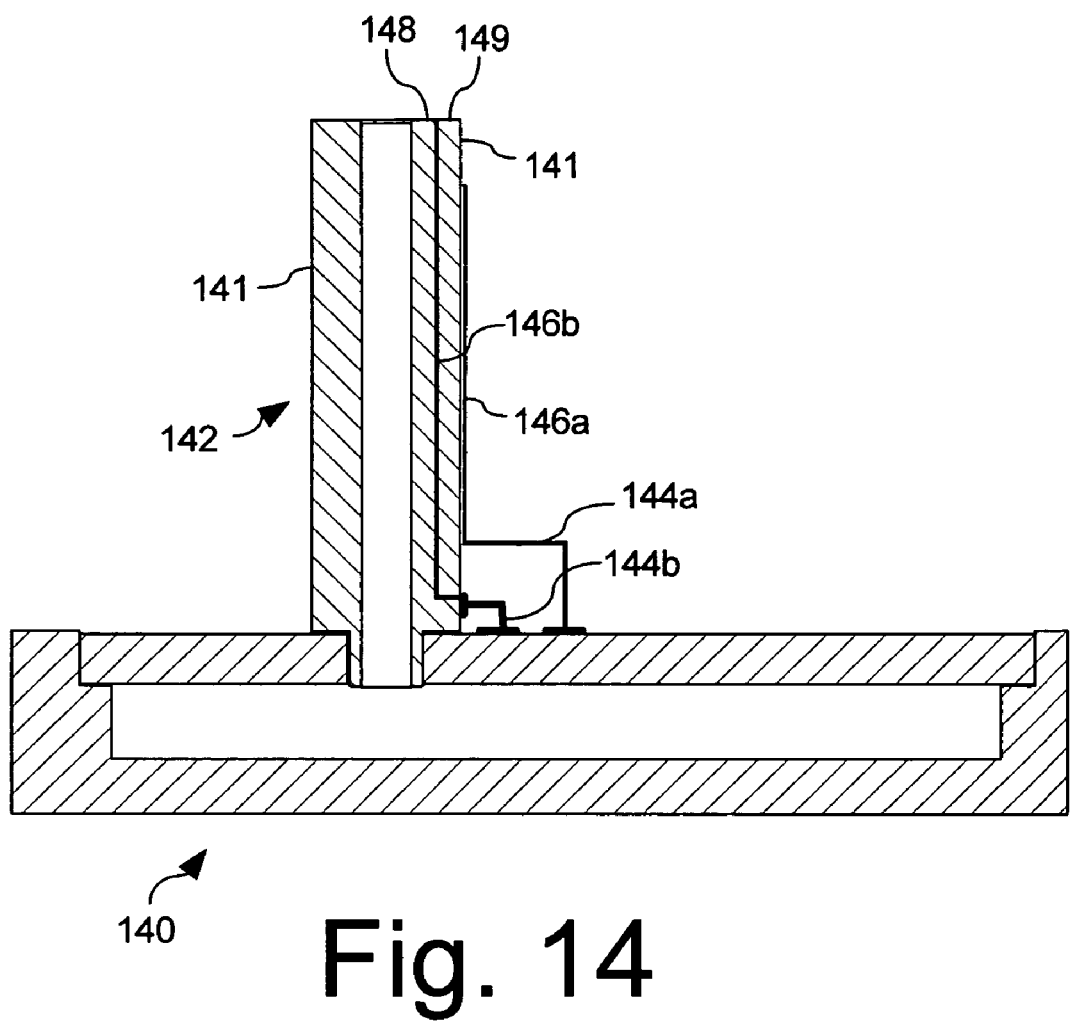
FIG. 14 is a cross-sectional view showing an alternative embodiment of the invention.

Further, it should be noted that in the various embodiments shown in FIGS. 2-13, the conductive traces are shown disposed on an outermost surface of body 200 and conduit 400. However, it should be understood that the invention is not limited in this regards. For example, the shell of conduit can be comprised of multiple ceramic layers. Each of the layers can have a surface on which one or more conductive traces are disposed. A cross-sectional view showing an example of such a multi-layer conduit construction is illustrated in FIG. 14. In FIG. 14, a body 140 is compression fitted to a conduit 142 in the manner previously described. The conduit 140 includes an outer surface 141 formed of ceramic layer 149 on which conductive trace 146a is disposed. However, the conduit 140 can include additional conductive traces, such as conductive trace 146b. Conductive trace 146b can be disposed on a surface of a separate ceramic layer 148 disposed beneath ceramic layer 149. A similar multi-layer approach could be used for body 200, although it is not shown in FIG. 14. The connection between the conductive traces of the conduit and the body can be formed using any of the techniques described herein. For example, wires 144a, 144b can be bonded to the conductive traces as shown. Alternatively, the direct contact and/or adhesive approach described herein can also be used.

Those skilled in the art will appreciate that the ceramic material that is used to form body 200 and conduit 400 can be any suitable ceramic material. For example, low temperature co-fired ceramic (LTCC) or high temperature co-fired ceramic (HTCC) can be used for this purpose. LTCC is a glass ceramic material that is calcined at 850° C. to 1,000° C. This class of materials has a number of advantages that make it especially useful as substrates for electro-fluidic systems. For example, low temperature 951 co-fire Green Tape™ from Dupont® Corporation of Research Triangle Park, N.C. is Au and Ag compatible, and it has a thermal coefficient of expansion (TCE) and relative strength that are suitable for many applications. Other LTCC ceramic tape products are available from Electro-Science Laboratories, Inc. of 416 East Church Road, King of Prussia, Pa. 19406-2625, USA. Another LTCC material that can be used is part number A6-M available from Ferro Corp. of Cleveland, Ohio 44114. Still, there are a variety of other ceramic materials that can be used and the invention is not so limited. Manufacturers of LTCC products typically also offer metal pastes compatible with their LTCC products for defining conductive metal traces and vias.

The process flow for traditional LTCC processing includes (1) cutting the green (unfired) ceramic tape from the roll, (2) removing the backing from the green tape, (3) punching holes for electrical vias, (4) filling via holes with conductor paste and screen printing patterned conductors, (5) stacking, aligning and laminating individual tape layers, (6) firing the stack to sinter and densify powders, and (7) sawing the fired ceramic to desired dimensions, if necessary. Any of the foregoing processing steps can be used in the present invention for forming the various parts of the electro-fluidic interconnect described herein.

While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components or steps may be added to, combined with, or substituted for the components or steps described herein while the same or similar results would be achieved. All such similar substitutes and modifications apparent to those skilled in the art are deemed to be within the spirit, scope and concept of the invention as defined by the appended claims. Accordingly, the exclusive rights sought to be patented are as described in the claims below.

We claim:

1. An electro-fluidic interconnect, comprising:

a body formed of a ceramic material, said body having an aperture with a predetermined profile formed therein;

a conduit formed of said ceramic material having a hollow bore for transporting a fluid;

a mating portion of said conduit formed with an exterior profile that matches said predetermined profile of said aperture, said mating portion of said conduit compression fitted within said aperture;

at least one conductive trace disposed on a surface of said body electrically connected to at least one conductive trace disposed on a surface of said conduit.

2. An electro-fluidic interconnect, comprising:

a body formed of a ceramic material and having at least one aperture, said aperture having at least a first mating portion associated therewith, said mating portion having an interior profile and an exterior profile;

a conduit formed of a ceramic material, said conduit having at least one hollow bore for transporting a fluid and at least a second mating portion, at least one of an interior profile of said second mating portion and an exterior profile of said second mating portion sized and shaped to generally match at least one of said interior profile or said exterior profile of said first mating portion;

said first and said second mating portions interfitted with one another and forming a compression fitting.

3. An electro-fluidic interconnect, comprising:

a body formed of a ceramic material, said body having an aperture with a predetermined profile formed therein;

a conduit formed of said ceramic material having a hollow bore for transporting a fluid;

a mating portion of said conduit formed with an exterior profile that matches said predetermined profile of said aperture, said mating portion of said conduit compression fitted within said aperture at least one conductive trace on a surface of said body and at least one conductive trace on a surface of said conduit.

4. The electro-fluidic interconnect according to claim 3, wherein said mating portion of said conduit is chemically bonded with a surface defining said aperture.

5. The electro-fluidic interconnect according to claim 3, wherein said at least one conductive trace on said surface of said body and said at least one conductive trace on said surface of said conduit are electrically connected at least one conductive trace on a surface of said body and at least one conductive trace on a surface of said conduit wherein said at least one conductive trace on said surface of said body and said at least one conductive trace on said surface of said conduit are electrically connected.

6. The electro-fluidic interconnect according to claim 5, wherein said at least one conductive trace on said surface of said body and said at least one conductive trace on said surface of said conduit are physically aligned and wherein said at least one conductive trace on said surface of said body and said at least one conductive trace on said surface of said conduit are maintained in direct physical contact.

* * * * *